(12) United States Patent
Warburton et al.

(10) Patent No.: US 12,069,025 B2
(45) Date of Patent: Aug. 20, 2024

(54) NETWORKING AND SECURITY SPLIT ARCHITECTURE

(71) Applicant: Palo Alto Networks, Inc., Santa Clara, CA (US)

(72) Inventors: Thomas Arthur Warburton, San Jose, CA (US); Hao Long, Campbell, CA (US); Shu Lin, Saratoga, CA (US); Mingfei Peng, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 69 days.

(21) Appl. No.: 17/559,966

(22) Filed: Dec. 22, 2021

(65) Prior Publication Data

US 2023/0198944 A1 Jun. 22, 2023

(51) Int. Cl.
*H04L 9/40* (2022.01)
*H04L 47/20* (2022.01)

(52) U.S. Cl.
CPC .......... *H04L 63/0209* (2013.01); *H04L 47/20* (2013.01); *H04L 63/0272* (2013.01); *H04L 63/0485* (2013.01)

(58) Field of Classification Search
None
See application file for complete search history.

(56) References Cited

U.S. PATENT DOCUMENTS

| | | | |
|---|---|---|---|
| 11,095,612 B1 | 8/2021 | Oswal | |
| 11,606,314 B2* | 3/2023 | Cidon | H04L 47/827 |
| 11,677,720 B2* | 6/2023 | Mayya | H04L 63/0281 726/15 |
| 2015/0188943 A1* | 7/2015 | Williams | H04L 12/4633 713/151 |
| 2016/0294646 A1* | 10/2016 | Kirner | H04L 41/0893 |
| 2017/0163666 A1* | 6/2017 | Venkatramani | H04L 63/1416 |
| 2018/0097720 A1* | 4/2018 | Jaffer | H04L 45/22 |
| 2019/0089678 A1 | 3/2019 | Lam | |
| 2019/0190813 A1* | 6/2019 | Xu | H04L 45/64 |
| 2020/0137024 A1* | 4/2020 | Janakiraman | H04L 63/0236 |
| 2021/0006539 A1 | 1/2021 | Zuk | |
| 2021/0058371 A1* | 2/2021 | Baabdallah | H04L 63/0263 |
| 2021/0227056 A1* | 7/2021 | Aluvala | H04L 12/4633 |
| 2021/0409335 A1* | 12/2021 | Zhu | H04L 47/24 |
| 2022/0103594 A1* | 3/2022 | Galloway | H04L 63/205 |
| 2022/0247761 A1* | 8/2022 | Subbanna | H04L 63/1425 |
| 2022/0353240 A1 | 11/2022 | McDowall | |

OTHER PUBLICATIONS

Chowdary et al., SDFW: SDN-Based Stateful Distributed Firewall, Nov. 1, 2018,.
Eraslan et al., A Distributed Firewall Appliance, 2006, pp. 1-4.
Zaballa et al., P4Knocking: Offloading Host-Based Firewall Functionalities to the Network, 1st Workshop on Flexible Network Data Plane Processing (NETPROC@ICIN2020), 2020, pp. 7-12.

* cited by examiner

*Primary Examiner* — Trang T Doan
(74) *Attorney, Agent, or Firm* — Van Pelt, Yi & James LLP (57) ABSTRACT

Techniques for providing a networking and security split architecture are disclosed. In some embodiments, a system, process, and/or computer program product for providing a networking and security split architecture includes receiving a flow at a security service; processing the flow at a network layer of the security service to perform one or more networking functions; and offloading the flow to a security layer of the security service to perform security enforcement based on a policy.

16 Claims, 8 Drawing Sheets

NETWORKING AND SECURITY SPLIT ARCHITECTURE

BACKGROUND OF THE INVENTION

A firewall generally protects networks from unauthorized access while permitting authorized communications to pass through the firewall. A firewall is typically a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, antimalware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™ KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Security Solutions in Increasing Bandwidth Network Environments Security service providers offer various commercially available security solutions including various firewall, VPN, and other security related services. For example, some security service providers provide their customers with such security solutions including various firewall, VPN, and other security related services. However, the increasing bandwidth network environments (e.g., enterprise network environments with 100 Gigabyte (100G) links) present technical challenges for such security solutions.

Specifically, what is needed are new and improved solutions to efficiently facilitate high throughput for such security solutions. For example, private and public cloud networks are moving towards 100G or higher speed networks (e.g., networks with 100G or higher speed links). As a result, it is increasingly expensive to provide virtual security solutions (e.g., at 100G or higher speeds, such as virtual security solutions for commercially available Palo Alto Networks' firewalls, which are provided using various commercial virtualized environments, including, for example, VMware® ESXi™ and NSX™, Citrix® Netscaler SDX™, KVM/OpenStack (Centos/RHEL, Ubuntu®), and Amazon Web Services (AWS) or for various other commercially available firewall solutions). An example existing approach is to attempt to offload with a VM/CN-Series virtualized environment that is in user space. However, this approach is expensive in terms of computing resources utilized for such offloading operations.

Overview of Techniques for Providing a Networking and Security Split Architecture There are many technical challenges we need to overcome in the current SASE (Security Access Service Edge) environment. Examples of these technical challenges will now be described. The networking function is associated with external resources, which are networking centric and not inherently elastic in nature, such as Public IP addresses and Private IP address pools, etc. Also, it is generally technically challenging to achieve true elasticity for security handling capacity. As another example, it is generally technically challenging to leverage third party or cloud provider services and functions to achieve better service level performance and availability.

Accordingly, various techniques for providing a networking and security split architecture are disclosed. One example, as described herein, is a new networking and security split architecture that splits a security entity (e.g., a network gateway firewall (NGFW), such as using the PanOS platform, e.g., Palo Alto Networks VM/CN-Series virtual firewall platforms available from Palo Alto Networks, Inc., headquartered in Santa Clara, CA or other commercially available security platforms can similarly be modified using the disclosed split networking and security architecture techniques as described herein) into the networking functional layer and the security functional layer.

In an example implementation, the networking functional layer is implemented in the front end to terminate and handle networking tasks, such as IPSec termination, routing, network address translation (NAT), etc. We refer herein to this layer as a Networking Anchor Layer. The security functional layer is put in the backend to handle security tasks, such as Layer-7 Content Inspection, SSL Decryption, URL filter, etc. We refer herein to this layer as a Security Offloading Layer. The interface between these two layers is called the Offloading Interface.

In this example implementation, once the network traffic is received at the Networking Anchor Layer, we can apply IPSec termination, networking lookup, and then load balancing to the various Security Offloading Layer instances. The Security Offloading Layer instances will then perform a security policy lookup, Layer-7 content inspection, and possible SSL Decryption, or other security functionality. After the security processing, the network traffic will be forwarded back to the Networking Anchor Layer for routing and possible NAT functionality.

The disclosed networking and security split architecture provides various improvements over the existing approaches to security solutions. For example, the Networking Anchor Layer can provide better unit performance as such a layer is not required to perform the CPU intensive security tasks. As such, this layer can aggregate more networking resources, such as public IP address and private IP address pools. This will generally reduce the change and difficulty to manage these networking resources across instance boundaries (e.g., across virtual firewall instance boundaries).

As another example, the Security Offloading Layer is relatively networking agnostic. As such, the Security Offloading Layer can be deployed more elastically without networking or location knowledge.

In some embodiments, a system, process, and/or computer program product for providing a networking and security split architecture includes receiving a flow at a security service (e.g., a cloud-based security service, such as using a public cloud service provider or a plurality of public cloud service providers); processing the flow at a network layer (e.g., network anchor instance) of the security service to perform one or more networking functions; and offload the flow to a security layer (e.g., an offloading security instance) of the security service to perform security enforcement based on a policy.

For example, the flow can be determined to be a new flow at the security service, and meta information can be extracted from the flow during processing of the flow at the network layer of the security service, in which the meta information includes an application identification associated with the flow.

The processing of the flow at the network layer can include performing one or more of the following: IPSEC termination, routing, network address translation (NAT), and deep packet inspection.

The security layer can include a plurality of security instances (e.g., of a firewall) and/or the plurality of security instances can be implemented to perform distinct micro services of security functions including one or more of the following: antivirus, antispam, DNS security, intrusion detection/prevention security (IDS/IPS), and data exfiltration security.

The network layer can include one or more of the following: a network router, a virtual private network (VPN) gateway, and a load balancer (e.g., the load balancer can send the first packet of a session to one security instance of the security layer and send the following packet of the same session to the same security instance of the security layer).

After the flow is closed, session statistics associated with the flow can be generated by the security layer.

The disclosed techniques providing a networking and security split architecture can be applied to any deployment for enhanced security solutions. As an example, the disclosed techniques can be applied to high bandwidth network environments, such as service provider network environments. Specifically, service provider deployments (e.g., AT&T, Verizon, or other commercially available service cellular and/or Internet/network service provider deployments) generally are associated with high bandwidth network environments (e.g., such service providers typically desire very high throughput (e.g., 100 Gbps)). Service provider deployments are also generally associated with network environments in which a majority of the network traffic is typically passthrough traffic (e.g., elephant flows). As such, a significant percentage of the network traffic in service provider networks is within a smaller number of flows that have the potential to be bypassed for security inspection (e.g., in an example service provider network, about 80% of the network traffic can be offloaded as that is the percentage of elephant flows that are passing across this example service provider network). These elephant flows are typically video streams (e.g., video streaming using Netflix, YouTube, etc.) and/or video conferencing (e.g., video conferencing using Zoom, WebEx, etc.).

Other example types of network traffic that can benefit from using the disclosed techniques for providing a networking and security split architecture include SSH, SSL, and IPSEC associated network traffic that is encrypted using these or other encrypted network protocols. Given that service providers are typically in the middle of the flows between their customers, the service providers generally would not have the necessary keys to inspect such encrypted network traffic and, as such, this encrypted traffic can also be effectively offloaded using the disclosed techniques. Various other types of network traffic can similarly be effectively offloaded using the disclosed techniques.

Accordingly, various techniques for providing a networking and security split architecture are disclosed as will also be further described below.

Figure 1:
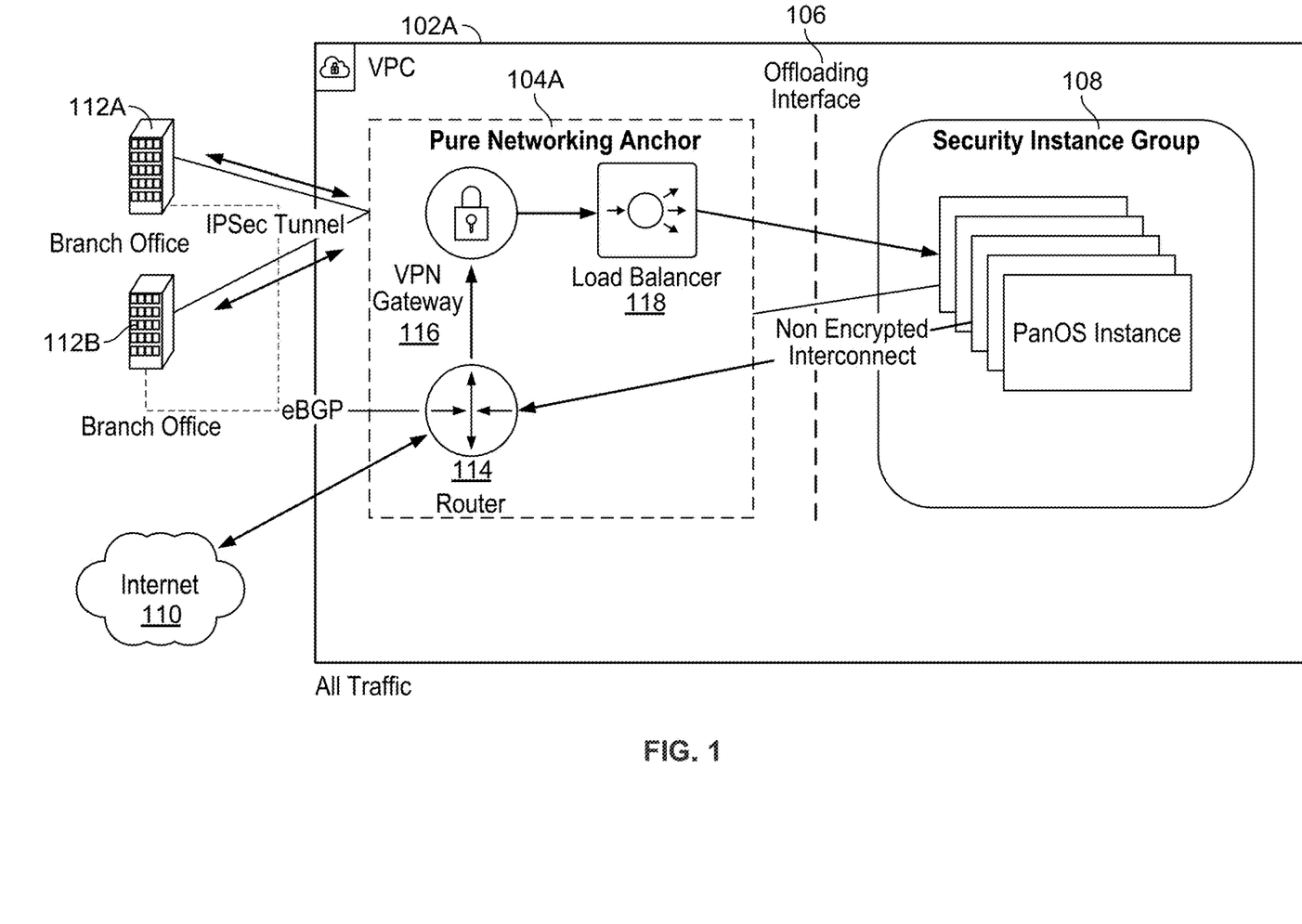
FIG. 1 is a functional diagram of a system architecture for providing a networking and security split architecture in accordance with some embodiments.

Example System Embodiments for Providing a Networking and Security Split Architecture FIG. 1 is a functional diagram of a system architecture for providing a networking and security split architecture in accordance with some embodiments. Referring to FIG. 1, a networking and security split architecture solution 102 (e.g., implemented as a cloud-based security service in a virtual private cloud (VPC)) is provided that includes a Networking Anchor Layer 104A (e.g., a lightweight version of the disclosed networking anchor layer (e.g., does not include a security processing component), which is implementing a layer for routing, terminating networking, underlay tunneling, network address translation (NAT), etc.), an Offloading Interface 106 (e.g., implementing a layer for providing a functional interface between the networking and security layers), and a Security Offloading Layer 108 (e.g., dynamically allocated securing processing instances for implementing a layer for security processing, such as SSL decryption, deep packet inspection (DPI) for security policy enforcement, etc.). As shown, the Networking Anchor Layer includes the following example components: a Router 114, a VPN gateway 116, and a Load Balancer 118 (e.g., implemented as an adaptive load balancer that performs policy based forwarding (PBF) and supports forwarding traffic to a next-hop group, which can contain multiple forwarding destinations (offloading instances) and can be dynamically added or removed, as well as using a group-based load-balanced hashing algorithm (e.g., session-ID/source-only/destination-only/source-destination/etc.)). As also shown, the Security Offloading Layer includes a security instance group (e.g., including multiple PanOS instances or another commercially available virtual/container-based security platform layer can be similarly implemented in this layer).

In this example implementation, the Networking Anchor Layer can provide better unit performance as such a layer is not required to perform the CPU intensive security tasks. As such, this layer can aggregate more networking resources, such as public IP address and private IP address pools. This will generally reduce the change and difficulty to manage these networking resources across instance boundaries (e.g., across virtual firewall instance boundaries). Also, this example lightweight Networking Anchor Layer (e.g., Pure Networking Anchor Layer) can cover 100% of the network traffic with the same forwarding path (e.g., which will provide the same scaling behavior to all applications and maintain security integrity). The Security Offloading Layer is relatively networking agnostic. As such, the Security Offloading Layer can be deployed more elastically without networking or location knowledge.

Network traffic from Branch Office 112A and 112B is sent via an IPSec tunnel to the Networking Anchor Layer. The Router routes non-encrypted traffic to the Security Offloading Layer, and routes encrypted traffic to the VPN Gateway. The Router can also route traffic to/from the Internet 110. The Load Balancer dynamically load balances the network traffic (e.g., based on layer-4 information associated with the network traffic or sessions) to the various security instances of the Security Offloading Layer as shown. In this example implementation, IP-user-mappings can be generated on both the Networking Anchor Layer and Security Offloading Layer, and an entry that is generated on one instance can be synced to all other instances.

Figure 2:
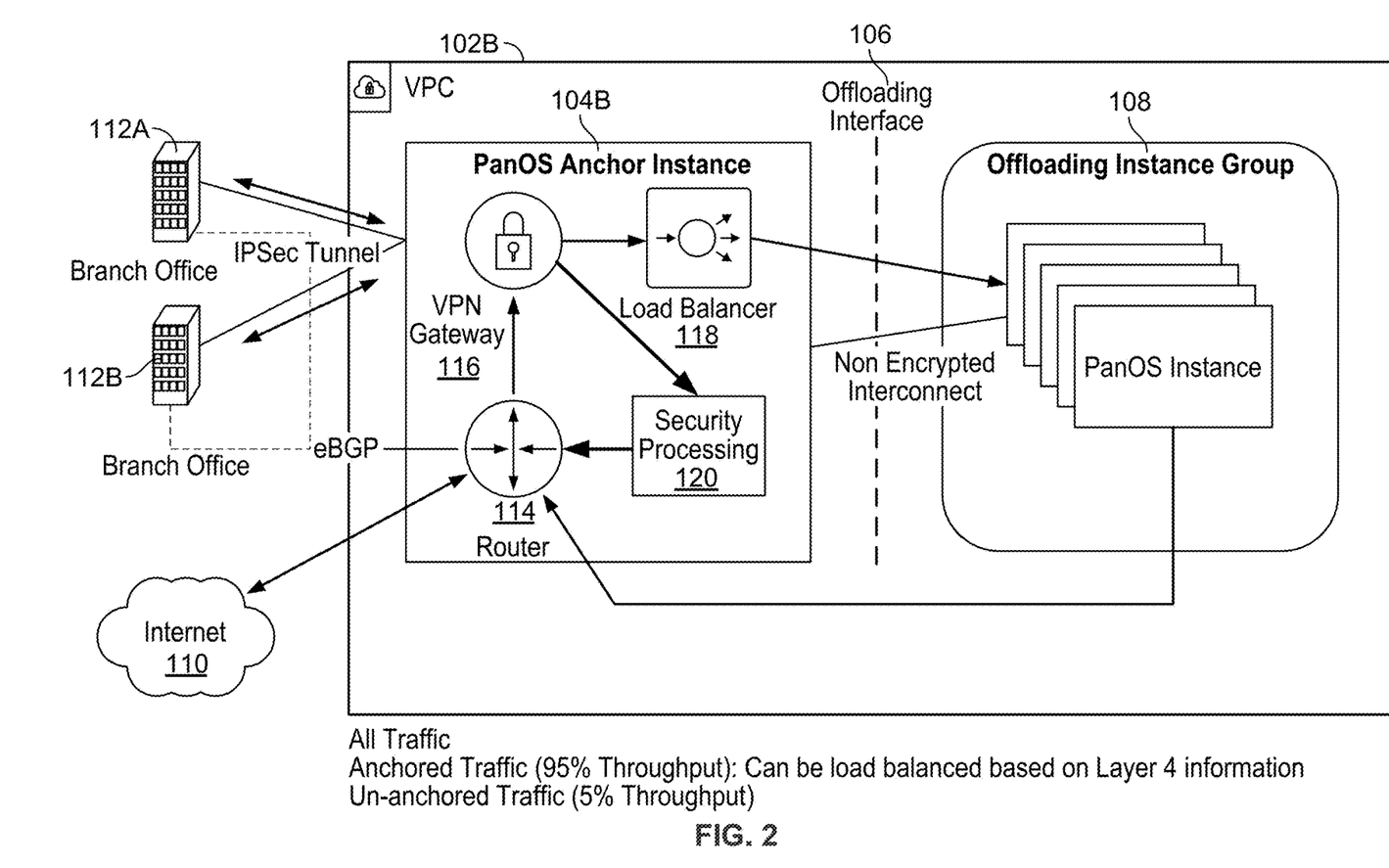
FIG. 2 is another functional diagram of a system architecture for providing a networking and security split architecture in accordance with some embodiments.

FIG. 2 is another functional diagram of a system architecture for providing a networking and security split architecture in accordance with some embodiments. Referring to FIG. 2, a networking and security split architecture solution 102B (e.g., implemented as a cloud-based security service in a virtual private cloud (VPC)) is similarly provided that includes a Networking Anchor Layer 104B (e.g., implementing a layer for routing, terminating networking, underlay tunneling, network address translation (NAT), etc.), an Offloading Interface 106 (e.g., dynamically allocated securing processing instances implementing a layer for providing a functional interface between the networking and security layers), and a Security Offloading Layer 108 (e.g., implementing a layer for security processing, such as SSL decryption, deep packet inspection (DPI) for security policy enforcement, etc.). As shown, the Networking Anchor Layer in this example implementation includes the following example components: a Router 114, a VPN gateway 116, and a Load Balancer 118 as well as a security processing component 120 for performing security processing on un-anchored network traffic (e.g., 5% throughput). As also shown, the Security Offloading Layer includes a security instance group (e.g., including multiple PanOS instances or another commercially available virtual/container-based security platform layer can be similarly implemented in this layer) for security processing on anchored traffic (e.g., 95% throughput), which can be load balanced based on layer-4 information as similarly described above with respect to FIG. 1.

Figure 3:
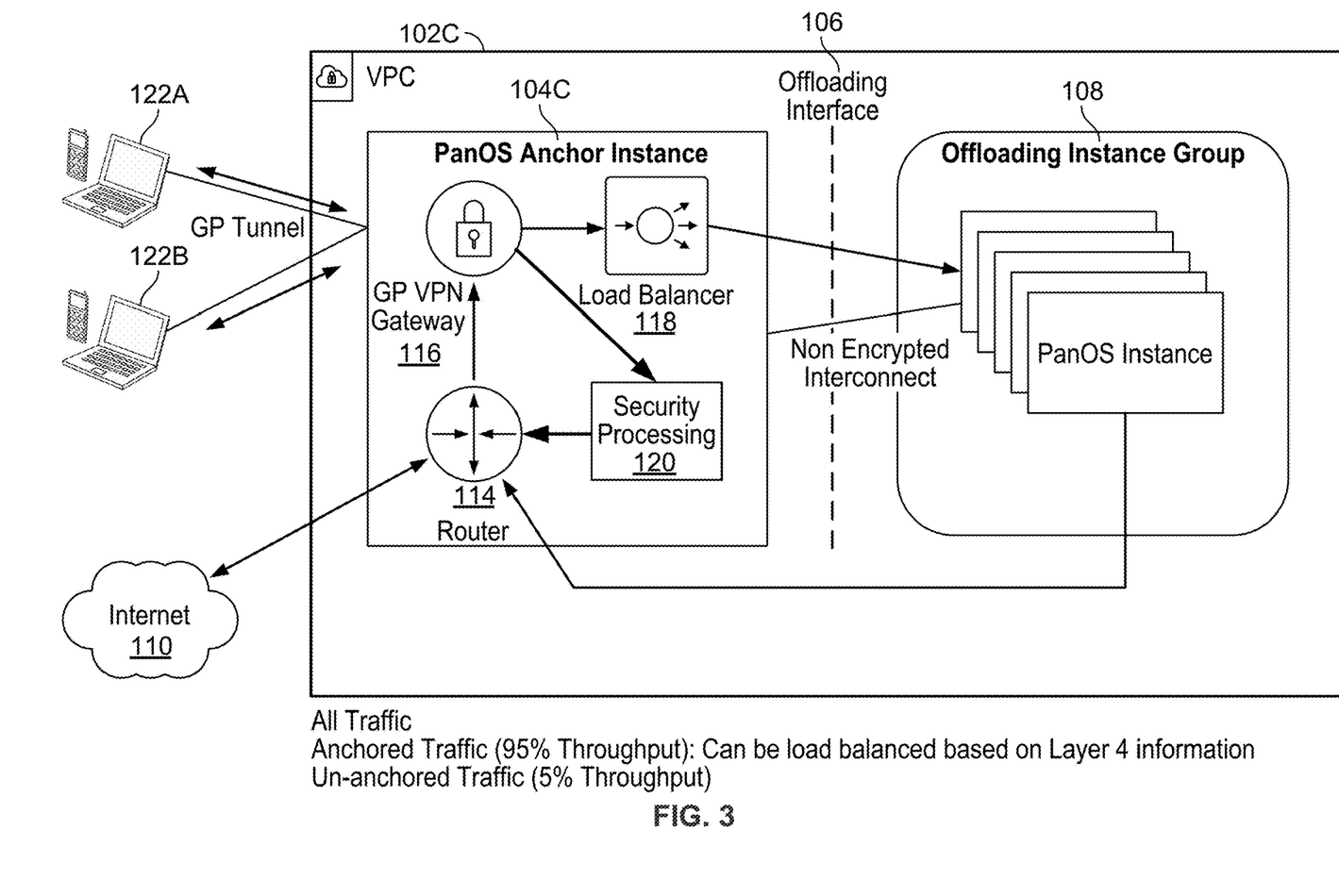
FIG. 3 is another functional diagram of a system architecture for providing a networking and security split architecture in accordance with some embodiments.

FIG. 3 is another functional diagram of a system architecture for providing a networking and security split architecture in accordance with some embodiments. Referring to FIG. 3, a networking and security split architecture solution 102C (e.g., implemented as a cloud-based security service in a virtual private cloud (VPC)) is similarly provided for endpoint computing devices 122A and 122B that connect via a secure tunnel (e.g., Global Protect (GP) VPN tunnel, provided using a Global Protect (GP) agent commercially available from Palo Alto Networks, Inc., or another secure endpoint agent can similarly be used) for connecting network traffic communications with networking and security split architecture solution 102C. As similarly described above with respect to FIG. 2, networking and security split architecture solution 102C includes a Networking Anchor Layer 104C (e.g., implementing a layer for routing, terminating networking, underlay tunneling, network address translation (NAT), etc.), an Offloading Interface 106 (e.g., implementing a layer for providing a functional interface between the networking and security layers), and a Security Offloading Layer 108 (e.g., dynamically allocated securing processing instances implementing a layer for security processing, such as SSL decryption, deep packet inspection (DPI) for security policy enforcement, etc.). As shown, the Networking Anchor Layer in this example implementation includes the following example components: a Router 114, a VPN gateway 116, and a Load Balancer 118 as well as a security processing component 120 for performing security processing on un-anchored network traffic (e.g., 5% throughput). As also shown, the Security Offloading Layer includes a security instance group (e.g., including multiple PanOS instances or another commercially available virtual/container-based security platform layer can be similarly implemented in this layer) for security processing on anchored traffic (e.g., 95% throughput), which can be load balanced based on layer-4 information as similarly described above with respect to FIG. 1.

In this example implementation (e.g., as shown in FIGS. 2 and/or 3), the security processing performed in both the Security Processing component of the Networking Anchor Layer and the Security Offloading Layer can implement various DPI security processing techniques including user ID, content ID, and Application ID (App-ID) base security processing techniques as similarly described above (e.g., in contrast, in the example implementation of FIG. 1, such DPI security processing techniques are only performed in the Security Offloading Layer as similarly described above).

In this example implementation, meta information between the Networking Anchor Layers and Security Offloading Layers can be encapsulated in the forwarded network traffic. For example, security zone (e.g., source and destination) information can be carried to the security instances as zones are bound to ingress and egress interfaces of the Networking Anchor Layer instances (e.g., and other metadata information can also be provided).

L3/L4 Load Balancing

As similarly described above, the disclosed Split Architecture facilitates separate network and security processing for enhanced performance (e.g., high network bandwidth environments can benefit from these performance improvements as similarly described above). Networking components can handle the various networking resources, such as Public IPs, Private IP Pools, Border Gateway Protocol (BGP), and Tunneling (e.g., VPN tunneling, etc.), while security components can generally handle the various L7 security features, such as also similarly described above. In this example implementation, security components are designed to be elastic in a cloud native environment and based on our current network testing analysis, network components can handle much higher throughput of networking traffic than the security components. As such, an L3/L4 load balancer is further disclosed to facilitate efficiently redirecting some types of traffic into a group of security components from networking counterparts.

In an example implementation of the disclosed Split Architecture system design, PanOS VM-series are used as Anchor instances (e.g., alternatively, a 3rd party or other open source firewall solution can similarly be used as such Anchor instances). In this example implementation, a Policy-Based Forwarding (PBF) is enhanced to support an L3/L4 load balancer.

PBF (i.e., Policy-Based Forwarding) is a forwarding feature that has a higher priority than routing when making a forwarding decision. Given that not all traffic is forwarded to security components, PBF can be used to implement the traffic filtering. Currently, when using PBF, traffic can be redirected to only one destination, but in order to function as a load balancer, it is extended in this example implementation (e.g., an example PanOS VM-series implementation) to be able to forward to a group of next hops (e.g., multi-path).

Below is an example schema for implementation of the disclosed PBF to Multipath extension for this example PanOS VM-series implementation.

| Schema for PBF to Multipath |
|---|
| <pbf><br>  <sequence name="action" help-string="Policy-based-forwarding action"><br>    <choice><br>      <sequence name="forward-multipath" help-string="Forward to multiple nexthops"><br>        <element name="group" type="rangedint" min="1" max="4" help-string="multipath group id"/><br>        <element name="hash" type="enum" optional="yes" default="session" help-string="hash algorithm for multi-path"><br>          <enum value="session" help-string="hash based session id"/><br>          <enum value="source" help-string="hash based source ip"/><br>          <enum value="destination" help-string="hash based on destination ip"/><br>          <enum value="source-destination" help-string="hash based on source and destination IPs"/><br>        </element><br>      </sequence><br>      ...<br>    </choice> |

| Schema for PBF to Multipath |
|---|
|    </sequence><br></pbf> |

PBF Next Hop is a combination of the egress interface and next hop address that the packet is sent to.

PBF Multipath Group (e.g., total number is 4) is a group of PBF next hops (e.g., up to 64). If a session matches a PBF multipath rule, then it would forward to the next hops defined in this group, based on the hash algorithm defined in the rule.

A hash algorithm for a PBF Multipath Hash implementation decides which next hop of the traffic of a session can be used as the destination. The current support hash algorithms are based on source IP, destination IP, source-destination IP, and session-id.

Like all other PBF rules, PBF rule matching only happens for the very first packet of a session to determine the egress zone of a session.

Unlike other type PBF rules, PBF multipath rules only match c2s traffic. This rule would be ignored when doing s2c matching.

When hitting a PBF multi-path rule, however, no active next hops defined in the multipath group, this rule is ignored and routing is used instead.

As such, an anchor instance can still have full functionalities.

If a multi-path rule is hit, and there are active next hops in the group, one of the next hops is selected and cached inside the session based on the hash defined in the rule.

Packet matching this session forwards to the selected next hop.

Also, adding/removing next hop into/from the multipath group generally will not affect the existing sessions.

Performance Improvements in a Networking and Security Split Architecture

The disclosed networking and security split architecture can facilitate various performance improvements for a cloud-based security solution as will now be described.

For example, for Single Remote Node (RN) Performance, we can improve the single RN performance by offloading security load into the Offloading Layer as similarly described above.

Another important aspect is the overall performance per computing power (cores). The disclosed Split Architecture can enable the networking resource sticking to the Anchor (outer) Layer. This will allow the cloud-based security service to reduce the computing/processing cost at night while the traffic is light without hitting the overall performance at the daytime.

As such, the disclosed Split Architecture facilitates offloading the security processing as much as technically feasible to the inner layer. For example, if we can achieve a greater than 4:1 (inner vs outer) ratio, we will see the overall cost savings by not losing the performance.

Figure 7:
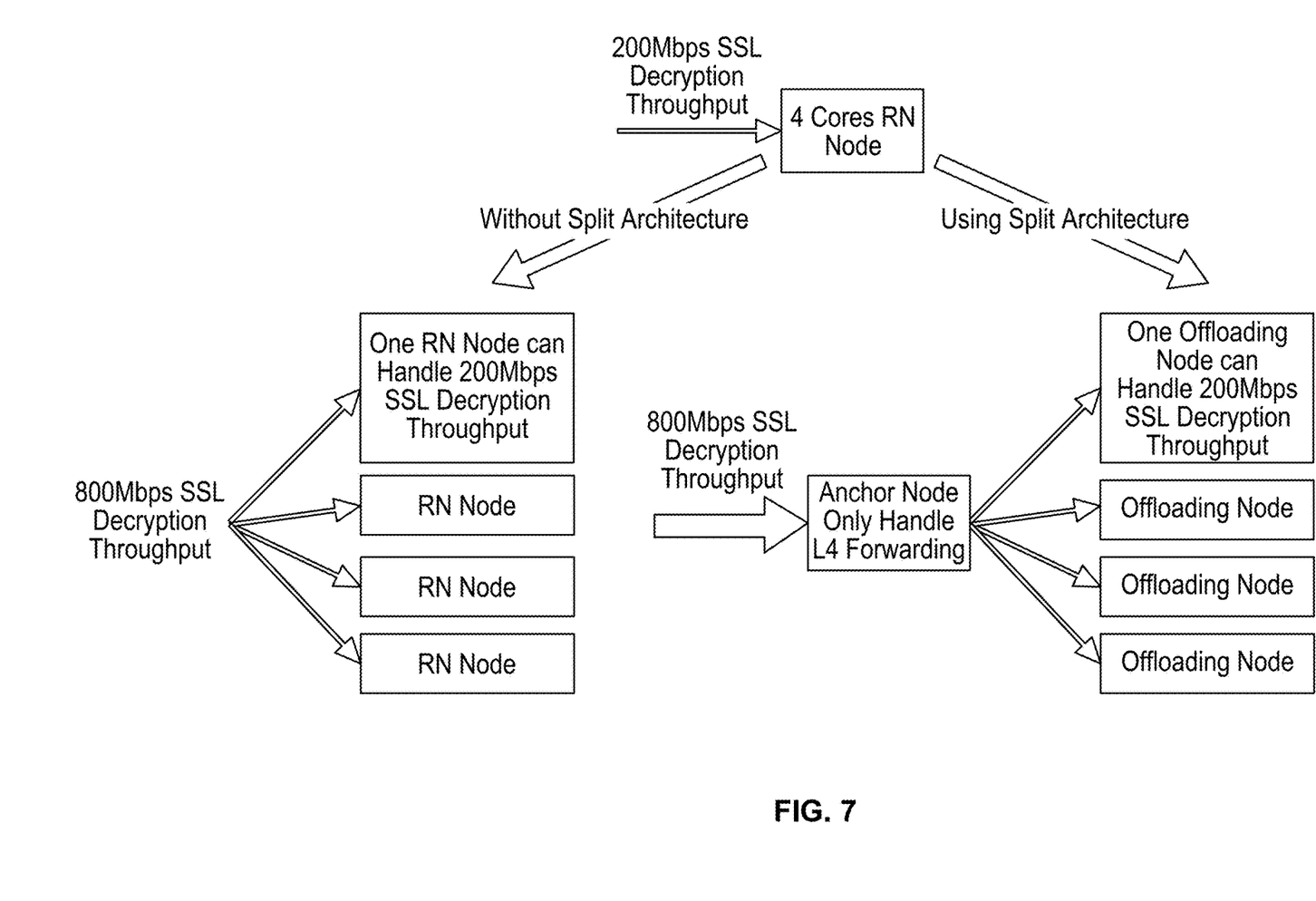
FIG. 7 illustrates an example of the performance improvements provided by the networking and security split architecture in accordance with some embodiments.

FIG. 7 illustrates an example of the performance improvements provided by the networking and security split architecture in accordance with some embodiments.

As shown in FIG. 7, for example, if one four cores' RN node can handle 250 Mbps SSL Decryption traffic, we can use this RN node to provisioning: one 200 Mbps RN; or four 50 Mbps RNs. The total aggregation throughput is 200 Mbps. Throughput per core is 50 Mbps/core. The single highest RN termination is 200 Mbps Without using the disclosed Split Architecture, if we perform FQDN-based scaling, we can separate four 50 Mbps RN to four different RN nodes, and then, each RN can reach up to 200 Mbps. Then, the total aggregation throughput is 800 Mbps. Throughput per core is still 50 Mbps/core. The single highest RN termination is still 200 Mbps. FQDN-based scaling makes RN scaling possible up to the capacity one Anchor Node can handle. However, FQDN-based scaling cannot scale up more on the single RN instance since the Anchor Node capacity limitation is there.

In contrast, using the disclosed Split Architecture, we can increase the throughput capacity on the Anchor Node by offloading heavy lifting SSL Decryption traffic to the inner Offloading layer. As such, with the disclosed Split Architecture, if we can achieve Anchor vs. Offloading 4:1 performance handling ratio, we can handle the traffic as follows: one 800 Mbps RN; or four 200 Mbps RNs. Then, in this case, the total aggregation throughput is 800 Mbps. Throughput per core is 40 Mbps/core. The single highest RN termination is 800 Mbps. As such, the high ceiling of RN capacity is significantly increased, which reveals how the disclosed Split Architecture can significantly improve the single RN performance.

Accordingly, the disclosed techniques for a networking and security split architecture are flexible and can work for any deployment of, for example, implementing the security instances of the Security Offloading Layer using virtual-based and/or container-based firewalls (e.g., Palo Alto Networks VM-Series or CN-Series firewalls or other commercially available virtual-based or container-based firewalls). For example, the disclosed split networking and security architecture can provide a significant throughput boost as all the computation cycles saved can be used for packet processing and additional firewall performance.

Figure 4A:
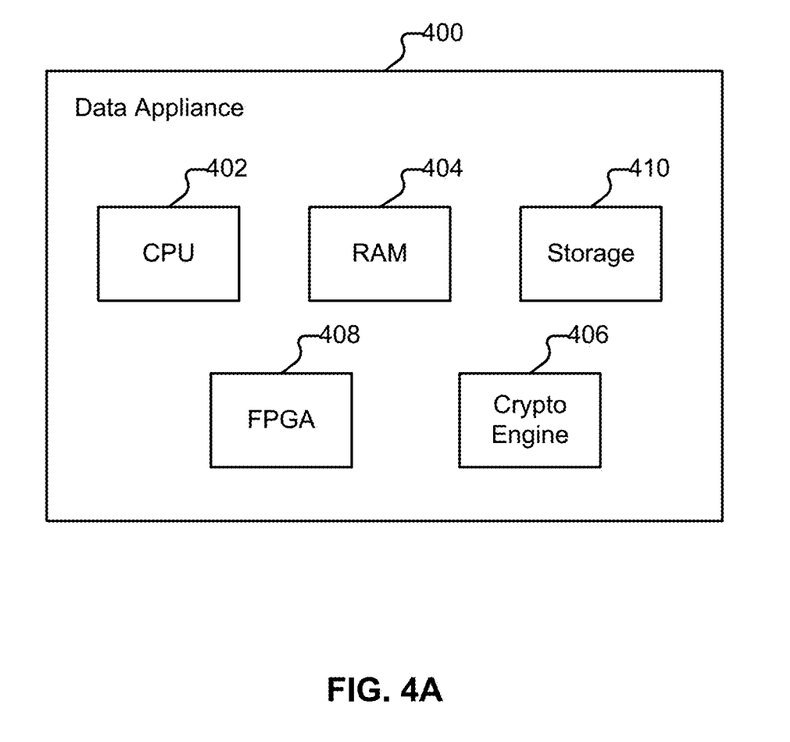
FIG. 4A is an embodiment of a data appliance.

An embodiment of data appliance 400 is shown in FIG. 4A. The example shown is a representation of physical components that can be included in network gateway 400 if the network gateway is implemented as a data appliance, in various embodiments. Specifically, the data appliance includes a high-performance multi-core Central Processing Unit (CPU) 402 and Random Access Memory (RAM) 404. The data appliance also includes a storage 410 (such as one or more hard disks or solid-state storage units). In various embodiments, the data appliance stores (whether in RAM 404, storage 410, and/or other appropriate locations) information used in monitoring an enterprise network and implementing the disclosed techniques. Examples of such information include application identifiers, content identifiers, user identifiers, requested URLs, IP address mappings, policy and other configuration information, signatures, hostname/URL categorization information, malware profiles, and machine learning models. The data appliance can also include one or more optional hardware accelerators. For example, the data appliance can include a cryptographic engine 406 configured to perform encryption and decryption operations, and one or more Field Programmable Gate Arrays (FPGAs) 408 configured to perform matching, act as network processors, and/or perform other tasks.

Functionality described herein as being performed by the data appliance can be provided/implemented in a variety of ways. For example, the data appliance can be a dedicated device or set of devices. The functionality provided by the data appliance can also be integrated into or executed as software on a general purpose computer, a computer server, a gateway, and/or a network/routing device. In some embodiments, at least some services described as being provided by the data appliance are instead (or in addition) provided to a client device (e.g., an endpoint device, such as a laptop, smart phone, etc.) by software executing on the client device.

Whenever the data appliance is described as performing a task, a single component, a subset of components, or all components of the data appliance may cooperate to perform the task. Similarly, whenever a component of the data appliance is described as performing a task, a subcomponent may perform the task and/or the component may perform the task in conjunction with other components. In various embodiments, portions of the data appliance are provided by one or more third parties. Depending on factors such as the amount of computing resources available to the data appliance, various logical components and/or features of the data appliance may be omitted, and the techniques described herein adapted accordingly. Similarly, additional logical components/features can be included in embodiments of the data appliance as applicable. One example of a component included in the data appliance in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

The disclosed system processing architecture can be used with different types of clouds in different deployment scenarios, such as the following: (1) public cloud; (2) private cloud on-premises; and (3) inside high-end physical firewalls. Some processing power can be allocated to execute a private cloud (e.g., using the management plane (MP) in the Palo Alto Networks PA-5200 Series firewall appliances).

Figure 4B:
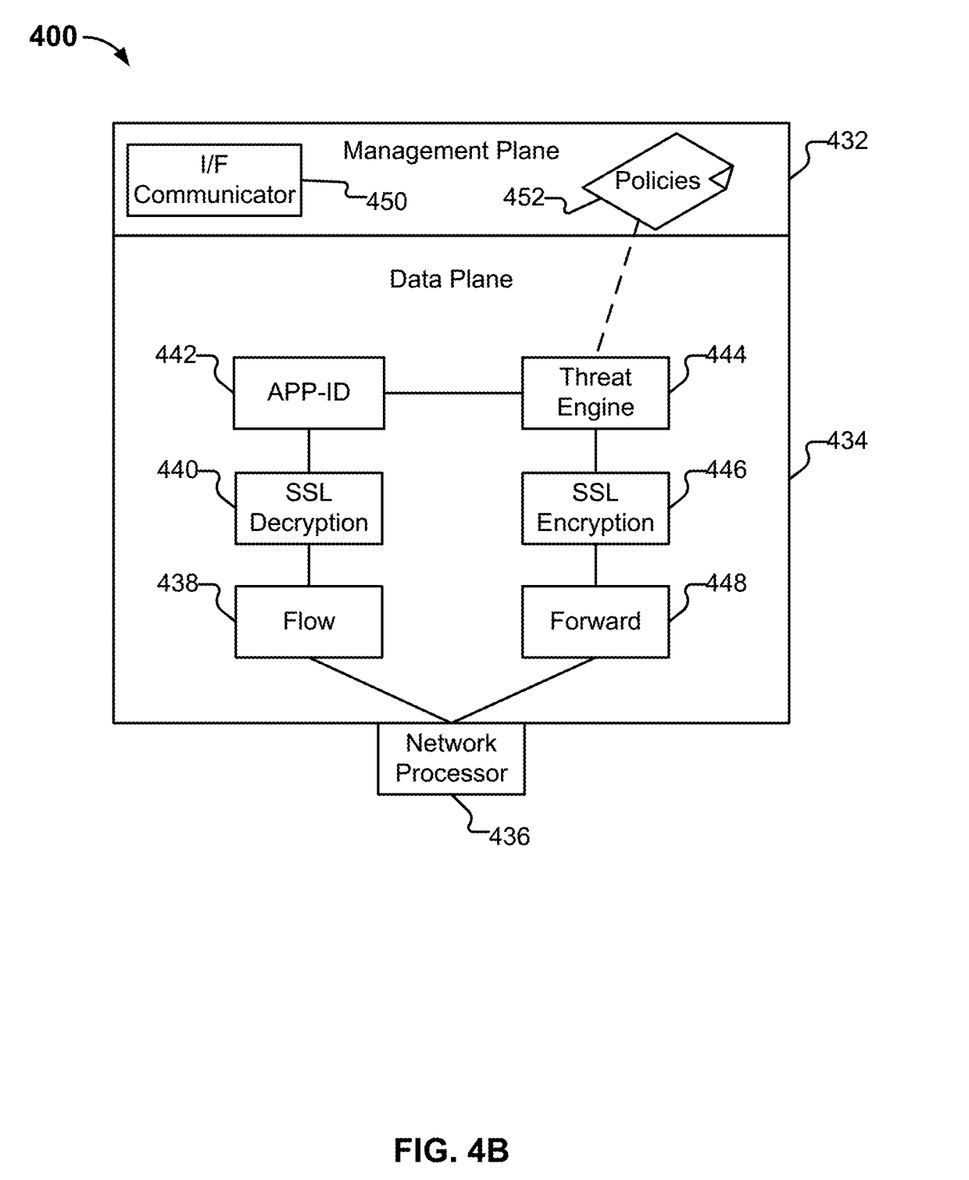
FIG. 4B is a functional diagram of logical components of an embodiment of a data appliance.

FIG. 4B is a functional diagram of logical components of an embodiment of a data appliance. The example shown is a representation of logical components that can be included in network gateway 400 in various embodiments. Unless otherwise specified, various logical components of network gateway 400 are generally implementable in a variety of ways, including as a set of one or more scripts (e.g., written in Java, python, etc., as applicable).

As shown, network gateway 400 comprises a firewall, and includes a management plane 432 and a data plane 434. The management plane is responsible for managing user interactions, such as by providing a user interface for configuring policies and viewing log data. The data plane is responsible for managing data, such as by performing packet processing and session handling.

Network processor 436 is configured to receive packets from client devices and provide them to data plane 434 for processing. Whenever flow module 438 identifies packets as being part of a new session, it creates a new session flow. Subsequent packets will be identified as belonging to the session based on a flow lookup. If applicable, SSL decryption is applied by SSL decryption engine 440. Otherwise, processing by SSL decryption engine 440 is omitted. Decryption engine 440 can help network gateway 400 inspect and control SSL/TLS and SSH encrypted traffic, and thus help to stop threats that might otherwise remain hidden in encrypted traffic. Decryption engine 440 can also help prevent sensitive content from leaving an enterprise/secured customer's network. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 442 is configured to determine what type of traffic a session involves. As one example, application identification engine 442 can recognize a GET request in received data and conclude that the session requires an HTTP decoder. In some cases, e.g., in a web browsing session, the identified application can change, and such changes will be noted by network gateway 400. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification (APP-ID) engine 442, the packets are sent, by threat engine 444, to an appropriate decoder configured to assemble packets (which may be received out of order) into the correct order, perform tokenization, and extract out information. Threat engine 444 also performs signature matching to determine what should happen to the packet. As needed, SSL encryption engine 446 can re-encrypt decrypted data. Packets are forwarded using a forward module 448 for transmission (e.g., to a destination).

As also shown in FIG. 4B, policies 452 are received and stored in management plane 432. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 450 is provided for management communications (e.g., via (REST) APIs, messages, or network protocol communications or other communication mechanisms).

Figure 5:
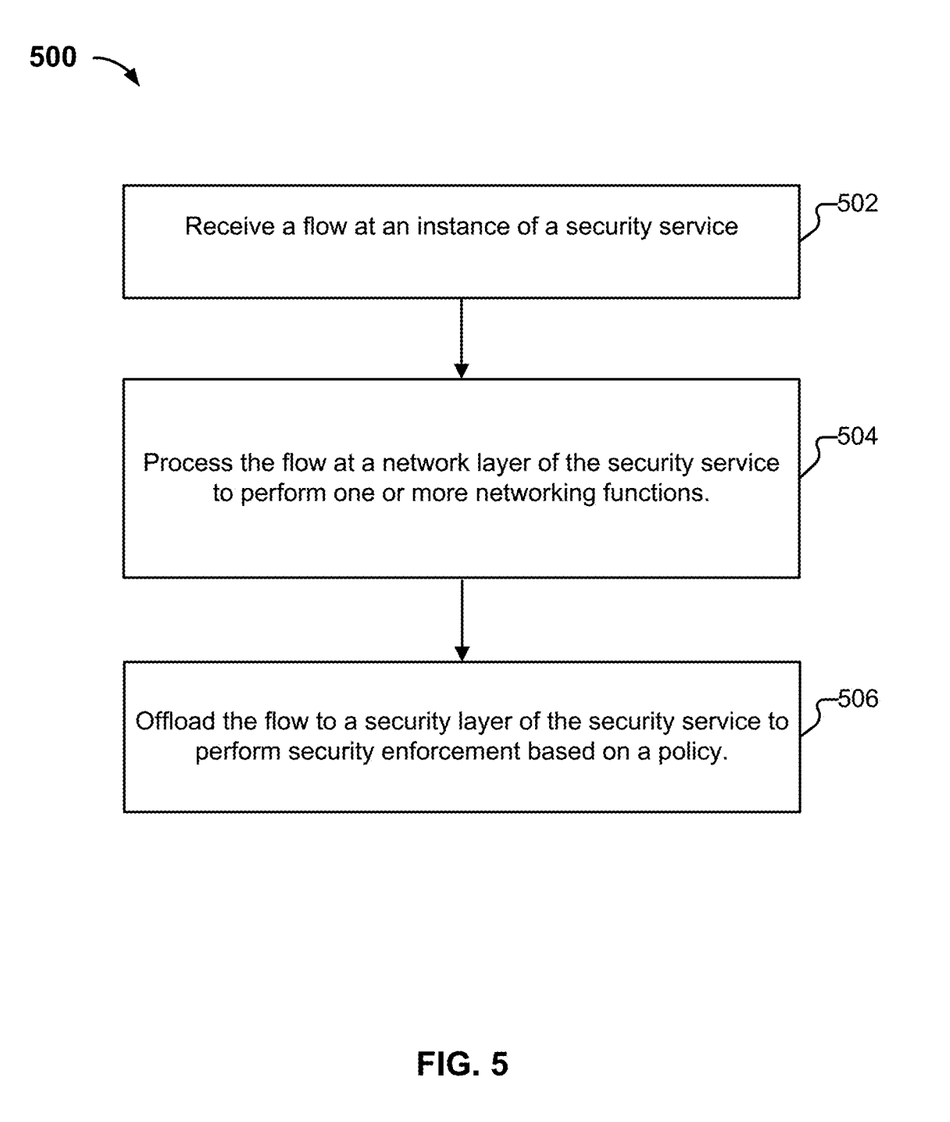
FIG. 5 is a flow diagram illustrating a process for providing a networking and security split architecture in accordance with some embodiments.

Example Process Embodiments for Providing a Networking and Security Split Architecture FIG. 5 is a flow diagram illustrating a process for providing a networking and security split architecture in accordance with some embodiments. In one embodiment, process 500 is performed using the system architectures described above (e.g., such as described above with respect to FIGS. 1-4B).

The process begins at 502 when a flow is received at a security service. For example, the security service can be a cloud-based security service as similarly described above. In an example implementation, the security service is implemented on a virtual-based/container-based network instance (e.g., a VM-Series or a CN-series firewall or a third party network instance or cloud service) for which flows are to be offloaded for security processing after network processing by the Networking Anchor Layer (e.g., all or a subset of the overall network traffic passing through the firewall) as similarly described above.

At 504, processing the flow at a network layer of the security service to perform one or more networking functions is performed. For example, IPSSEC termination, network routing, and/or network address translation (NAT) can be performed at the Networking Anchor Layer as similarly described above.

At 506, offloading the flow to a security layer of the security service to perform security enforcement based on a policy is performed. For example, a load balancer of the Networking Anchor Layer can send the flow to a security instance of the Security Offloading Layer as similarly described above.

Figure 6:
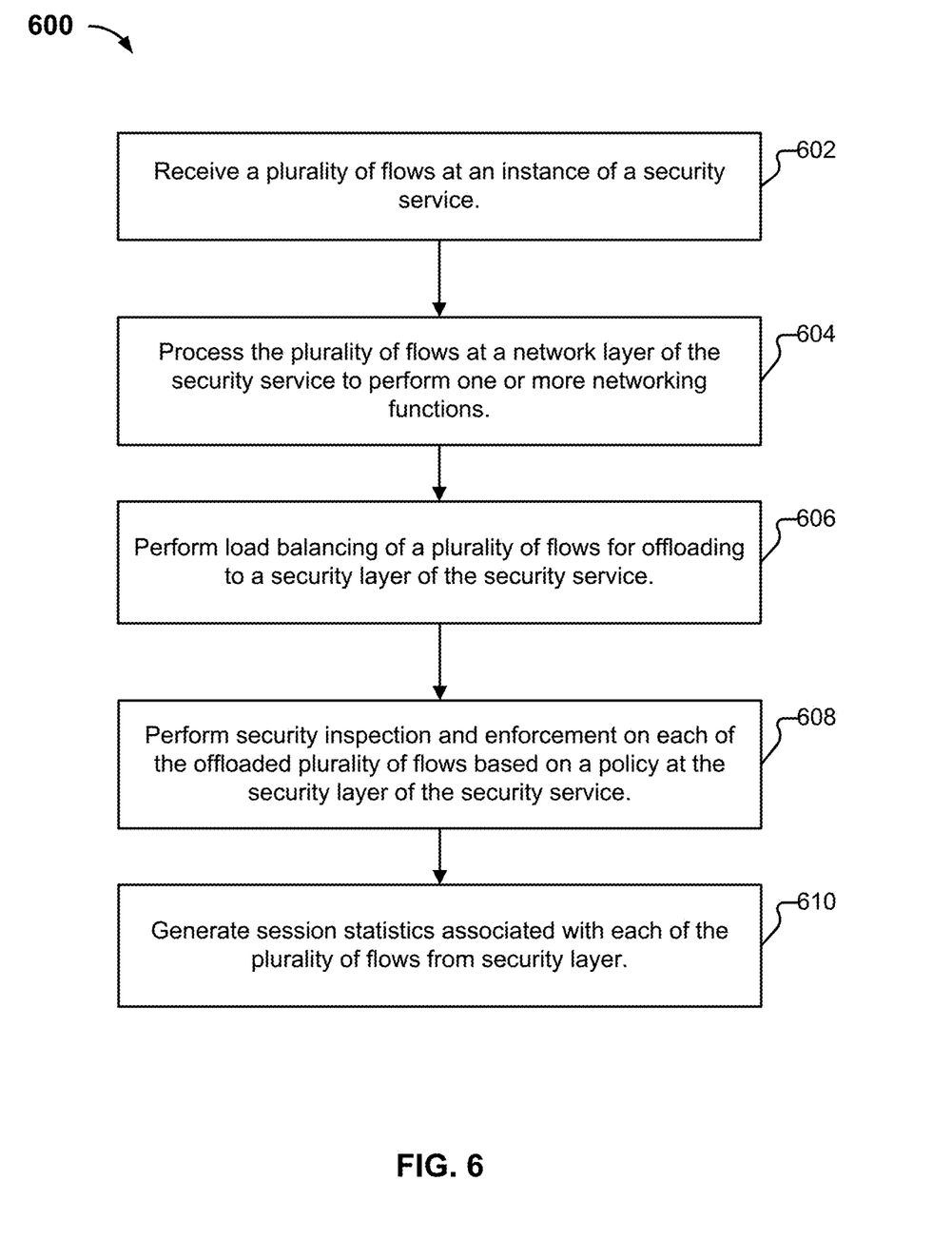
FIG. 6 is another flow diagram illustrating a process for providing a networking and security split architecture in accordance with some embodiments.

FIG. 6 is another flow diagram illustrating a process for providing a networking and security split architecture in accordance with some embodiments. In one embodiment, process 600 is performed using the system architectures described above (e.g., such as described above with respect to FIGS. 1-4B).

The process begins at 602 when a plurality of flows is received at a security service. For example, the security service can be a cloud-based security service as similarly described above. In an example implementation, the security service is implemented on a virtual-based/container-based network instance (e.g., a VM-Series or a CN-series firewall, or a third party network instance or cloud service) for which flows are to be offloaded for security processing after network processing by the Networking Anchor Layer (e.g., all or a subset of the overall network traffic passing through the firewall) as similarly described above.

At 604, processing the flows at a network layer of the security service to perform one or more networking functions is performed. For example, IPSSEC termination, network routing, and/or network address translation (NAT) can be performed at the Networking Anchor Layer as similarly described above.

At 606, load balancing of a plurality of flows for offloading to a security layer of the security service is performed. For example, the Networking Anchor Layer can include a load balancer as similarly described above.

At 608, security inspection and enforcement on each of the offloaded plurality of flows based on a policy at the security layer of the security service is performed. For example, a load balancer of the Networking Anchor Layer can send the flow to a security instance of the Security Offloading Layer as similarly described above.

At 610, session statistics associated with each of the plurality of flows are generated from the security layer as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a processor configured to:
receive a flow at a security service;
process the flow at a network layer of the security service to perform one or more networking functions, wherein the network layer performs one or more of the following: IPSEC termination, routing, and/or network address translation (NAT), and wherein the processing of the flow at the network layer comprises to:
determine whether the flow matches a policy-based forwarding rule; and
in response to a determination that the flow matches the policy-based forwarding rule:
determine whether the policy-based forwarding rule only matches client to server (c2s) traffic; and
in response to a determination that the policy-based forwarding rule only matches the c2s traffic:
determine whether a plurality of active next hops are defined based on the policy-based forwarding rule; and in response to a determination that the plurality of active next hops are defined:
   select an active next hop of the plurality of active next hops; and
   forward the flow to the selected active next hop, wherein the selected active next hop includes a security layer of the security service; and
offload the flow to the security layer of the security service to perform security enforcement based on a policy, wherein the security layer includes a plurality of security instances for distinct micro services of security functions including one or more of the following: antivirus, antispam, DNS security, intrusion detection/prevention security (IDS/IPS), and data exfiltration security; and
a memory coupled to the processor and configured to provide the processor with instructions.

2. The system recited in claim 1, wherein the flow is determined to be a new flow at the security service, and wherein meta information is extracted from the flow during processing of the flow at the network layer of the security service, and wherein the meta information includes an application identification associated with the flow.

3. The system recited in claim 1, wherein processing the flow at the network layer includes using deep packet inspection.

4. The system recited in claim 1, wherein the security layer includes a plurality of security instances.

5. The system recited in claim 1, wherein the security layer includes a security instance of a firewall.

6. The system recited in claim 1, wherein the network layer includes a network router.

7. The system recited in claim 1, wherein the network layer includes a virtual private network (VPN) gateway.

8. The system recited in claim 1, wherein the network layer includes a load balancer.

9. The system recited in claim 1, wherein the network layer includes a load balancer, and wherein the load balancer sends a first session of the flow to a first security instance of the security layer and sends a child of the first session of the flow to the first security instance of the security layer.

10. The system recited in claim 1, wherein the network layer includes a network anchor instance.

11. The system recited in claim 1, wherein the security service is a cloud-based security service.

12. The system recited in claim 1, wherein the security service is a cloud-based security service that is provided using a public cloud service provider.

13. The system recited in claim 1, wherein the security service is a cloud-based security service that is provided using a plurality of public cloud service providers.

14. The system recited in claim 1, wherein the processor is further configured to:
   close the flow; and
   receive session statistics associated with the flow from the security layer.

15. A method, comprising:
receiving a flow at a security service;
processing the flow at a network layer of the security service to perform one or more networking functions, wherein the network layer performs one or more of the following: IPSEC termination, routing, and/or network address translation (NAT), and wherein the processing of the flow at the network layer comprises:
   determining whether the flow matches a policy-based forwarding rule; and
   in response to a determination that the flow matches the policy-based forwarding rule:
      determining whether the policy-based forwarding rule only matches client to server (c2s) traffic; and
      in response to a determination that the policy-based forwarding rule only matches the c2s traffic:
         determining whether a plurality of active next hops are defined based on the policy-based forwarding rule; and
         in response to a determination that the plurality of active next hops are defined:
            selecting an active next hop of the plurality of active next hops; and
            forwarding the flow to the selected active next hop, wherein the selected active next hop includes a security layer of the security service; and
offloading the flow to the security layer of the security service to perform security enforcement based on a policy, wherein the security layer includes a plurality of security instances for distinct micro services of security functions including one or more of the following: antivirus, antispam, DNS security, intrusion detection/prevention security (IDS/IPS), and data exfiltration security.

16. A computer program product, the computer program product being embodied in a non-transitory tangible computer readable storage medium and comprising computer instructions for:
receiving a flow at a security service;
processing the flow at a network layer of the security service to perform one or more networking functions, wherein the network layer performs one or more of the following: IPSEC termination, routing, and/or network address translation (NAT), and wherein the processing of the flow at the network layer comprises:
   determining whether the flow matches a policy-based forwarding rule; and
   in response to a determination that the flow matches the policy-based forwarding rule:
      determining whether the policy-based forwarding rule only matches client to server (c2s) traffic; and
      in response to a determination that the policy-based forwarding rule only matches the c2s traffic:
         determining whether a plurality of active next hops are defined based on the policy-based forwarding rule; and
         in response to a determination that the plurality of active next hops are defined:
            selecting an active next hop of the plurality of active next hops; and
            forwarding the flow to the selected active next hop, wherein the selected active next hop includes a security layer of the security service; and
offloading the flow to the security layer of the security service to perform security enforcement based on a policy, wherein the security layer includes a plurality of security instances for distinct micro services of security functions including one or more of the following: antivirus, antispam, DNS security, intrusion detection/prevention security (IDS/IPS), and data exfiltration security.

* * * * *